United States Patent
Ghiold et al.

(10) Patent No.: US 11,902,282 B2
(45) Date of Patent: Feb. 13, 2024

(54) VALIDATING COMPLIANCE OF ROLES WITH ACCESS PERMISSIONS

(71) Applicant: Capital One Services, LLC, McLean, VA (US)

(72) Inventors: Matthew A. Ghiold, Glen Allen, TX (US); Muhammad Saad Tahir, Sterling, VA (US); Gavin McGrew, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 141 days.

(21) Appl. No.: 17/333,454

(22) Filed: May 28, 2021

(65) Prior Publication Data

US 2022/0385667 A1 Dec. 1, 2022

(51) Int. Cl.
*H04L 9/40* (2022.01)
*H04L 41/22* (2022.01)

(52) U.S. Cl.
CPC ............ *H04L 63/102* (2013.01); *H04L 41/22* (2013.01); *H04L 63/105* (2013.01); *H04L 63/20* (2013.01)

(58) Field of Classification Search
CPC ........ H04L 63/102; H04L 41/22; H04L 63/20
See application file for complete search history.

(56) References Cited

U.S. PATENT DOCUMENTS

| | | | |
|---|---|---|---|
| 7,171,459 B2 | 1/2007 | Sanghvi et al. | |
| 9,916,450 B2 | 3/2018 | Moloian et al. | |
| 10,021,138 B2 | 7/2018 | Gill et al. | |
| 10,122,757 B1 | 11/2018 | Kruse et al. | |
| 10,148,701 B1 | 12/2018 | Hecht et al. | |
| 10,225,152 B1 | 3/2019 | Roth et al. | |
| 10,430,606 B1 * | 10/2019 | Levit ..................... | G06F 16/252 |

(Continued)

FOREIGN PATENT DOCUMENTS

| | | |
|---|---|---|
| CN | 109829314 A | 5/2019 |
| WO | 2019244036 A1 | 12/2019 |

OTHER PUBLICATIONS

International Search Report and Written Opinion of the International Searching Authority directed to related International Patent Application No. PCT/US22/31390, dated Aug. 25, 2022; 7 pages.

(Continued)

*Primary Examiner* — Matthew Smithers
*Assistant Examiner* — Shu Chun Gao
(74) *Attorney, Agent, or Firm* — Sterne, Kessler, Goldstein & Fox P.L.L.C.

(57) ABSTRACT

Disclosed herein are system, method, and computer program product embodiments for displaying roles of an identity and access management (IAM) together with their corresponding compliance status of the assigned security policies with respect to a set of security rules. The method includes selecting a first role and a second role administered by an entity of the IAM system. Afterwards, the method includes determining, based on a set of security rules, a first compliance status of the first role associated with a first set of security policies; and a second compliance status of the second role associated with a second set of security policies. In addition, the method includes displaying on a GUI, the first role and the second role together with a first compliance status and a second compliance status.

20 Claims, 7 Drawing Sheets

(56) References Cited

U.S. PATENT DOCUMENTS

| | | | |
|---|---|---|---|
| 10,664,312 B2 | 5/2020 | Moloian et al. | |
| 10,749,886 B1 | 8/2020 | Kandel et al. | |
| 10,754,506 B1 | 8/2020 | Moyal et al. | |
| 10,803,169 B1 | 10/2020 | Flatten et al. | |
| 10,944,561 B1* | 3/2021 | Cahill | H04L 9/3213 |
| 10,965,686 B1 | 3/2021 | Agarwwal et al. | |
| 11,206,269 B1* | 12/2021 | Van Deman | G06F 21/45 |
| 11,368,492 B1 | 6/2022 | Engers et al. | |
| 2004/0078391 A1 | 4/2004 | Excoffier et al. | |
| 2007/0043771 A1 | 2/2007 | Ludwig et al. | |
| 2007/0073671 A1 | 3/2007 | McVeigh et al. | |
| 2008/0016580 A1 | 1/2008 | Dixit et al. | |
| 2012/0150912 A1 | 6/2012 | Ripberger | |
| 2013/0329738 A1 | 12/2013 | Yamagata et al. | |
| 2015/0026215 A1 | 1/2015 | Goel et al. | |
| 2015/0135257 A1 | 5/2015 | Shah et al. | |
| 2017/0034075 A1 | 2/2017 | Burk et al. | |
| 2017/0329957 A1 | 11/2017 | Vepa et al. | |
| 2018/0084012 A1 | 3/2018 | Joseph et al. | |
| 2018/0115550 A1* | 4/2018 | Sapir | G06F 21/6218 |
| 2018/0288063 A1 | 10/2018 | Koottayi et al. | |
| 2019/0007418 A1 | 1/2019 | Cook et al. | |
| 2019/0007443 A1 | 1/2019 | Cook et al. | |
| 2019/0073488 A1 | 3/2019 | Kruse et al. | |
| 2019/0236062 A1 | 8/2019 | Proctor et al. | |
| 2019/0327271 A1* | 10/2019 | Saxena | H04L 41/0895 |
| 2019/0362087 A1* | 11/2019 | Ferrans | H04L 63/102 |
| 2020/0007583 A1* | 1/2020 | Dixit | H04L 63/102 |
| 2020/0007677 A1 | 1/2020 | Bjontegard | |
| 2020/0076812 A1 | 3/2020 | Spurlock et al. | |
| 2020/0120098 A1* | 4/2020 | Berg | H04L 63/104 |
| 2020/0137097 A1 | 4/2020 | Zimmermann et al. | |
| 2020/0336489 A1 | 10/2020 | Wuest et al. | |
| 2020/0358778 A1 | 11/2020 | Gopinathapai et al. | |
| 2021/0182423 A1* | 6/2021 | Padmanabhan | G06F 21/6245 |
| 2022/0335148 A1 | 10/2022 | Gandhi et al. | |

OTHER PUBLICATIONS

SDNShield: Reconciliating Configurable Application Permissions for SDN App Markets. Wen. IEEE. (Year: 2016).

ASCAA: API-level security certification of android applications. Pei. IET Software. (Year: 2017).

PoLPer: Process-Aware Restriction of Over-Privileged Setuid Calls in Legacy Applications. Jeon. ACM. (Year: 2019).

* cited by examiner

VALIDATING COMPLIANCE OF ROLES WITH ACCESS PERMISSIONS

BACKGROUND

Computer applications often involve access control (AC) to system resources. AC is concerned with determining the allowed activities of legitimate users, mediating every request by a role to access a system resource in the system. Identity and access management (IAM) is a framework of business processes, policies and technologies that facilitates the management of electronic or digital identities of roles and system resources. With an IAM framework in place, information technology managers can manage AC to information or system resources within their organizations.

IAM systems can be deployed on premises, provided by a third-party vendor through a cloud-based subscription model, or deployed in a hybrid model. An IAM system can evaluate whether a role can access a system resource protected by the IAM system on a per-request basis. An IAM system can receive from a role a request to access a system resource. The IAM system can evaluate whether to grant or deny the requested access to the system resource based on a set of security policies assigned to the role. Current IAM systems still have many security issues that need further improvements.

BRIEF SUMMARY

Disclosed herein are system, apparatus, device, method and/or computer program product embodiments, and/or combinations and sub-combinations thereof for displaying a compliance status of a role of an identity and access management (IAM) system with respect to a set of security rules. The compliance status is determined by comparing a permissible scope of a name for a system resource defined by the set of security rules with a scope of the name for the system resource defined by a set of security policies, and by comparing a permissible scope of a name for a role defined by the set of security rules with a scope of the name for the role defined by the set of security policies. Multiple roles and their corresponding compliance status can be displayed in various forms on a graphical user interface (GUI), e.g., in a tabular form on the GUI.

In some examples, a computer-implemented method performed by a system can include selecting a first role administered by an entity and a second role administered by the entity. Afterwards, the method includes determining, based on a set of security rules, a first compliance status of the first role associated with a first set of security policies; and determining, based on the set of security rules, a second compliance status of the second role associated with a second set of security policies. In addition, the method includes displaying on a GUI, the first role and the first compliance status with respect to the set of security rules, and the second role and the second compliance status with respect to the set of security rules. In some examples, the first role and the first compliance status, and the second role and the second compliance status are displayed in a tabular form on the GUI.

In some examples, an apparatus for managing system resources can include a display device configured to display a GUI, a storage device coupled to the display device and configured to store a set of security rules, and a processor communicatively coupled to the storage device and the display device. The processor can be configured to select a first role administered by an entity and a second role administered by the entity. The processor can be further configured to determine, based on the set of security rules, a first compliance status of the first role associated with a first set of security policies; and determine, based on the set of security rules, a second compliance status of the second role associated with a second set of security policies. In addition, the processor can be configured to display on the GUI, the first role and the first compliance status with respect to the set of security rules, and the second role and the second compliance status with respect to the set of security rules.

In some examples, a non-transitory computer-readable medium can store instructions that, when executed by a processor, cause the processor to perform various operations. The operations can include selecting a first role administered by an entity and a second role administered by the entity. In addition, the operations include determining, based on a set of security rules, a first compliance status of the first role associated with a first set of security policies; and determining, based on the set of security rules, a second compliance status of the second role associated with a second set of security policies. In addition, the operations include displaying on a GUI, the first role and the first compliance status with respect to the set of security rules, and the second role and the second compliance status with respect to the set of security rules.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
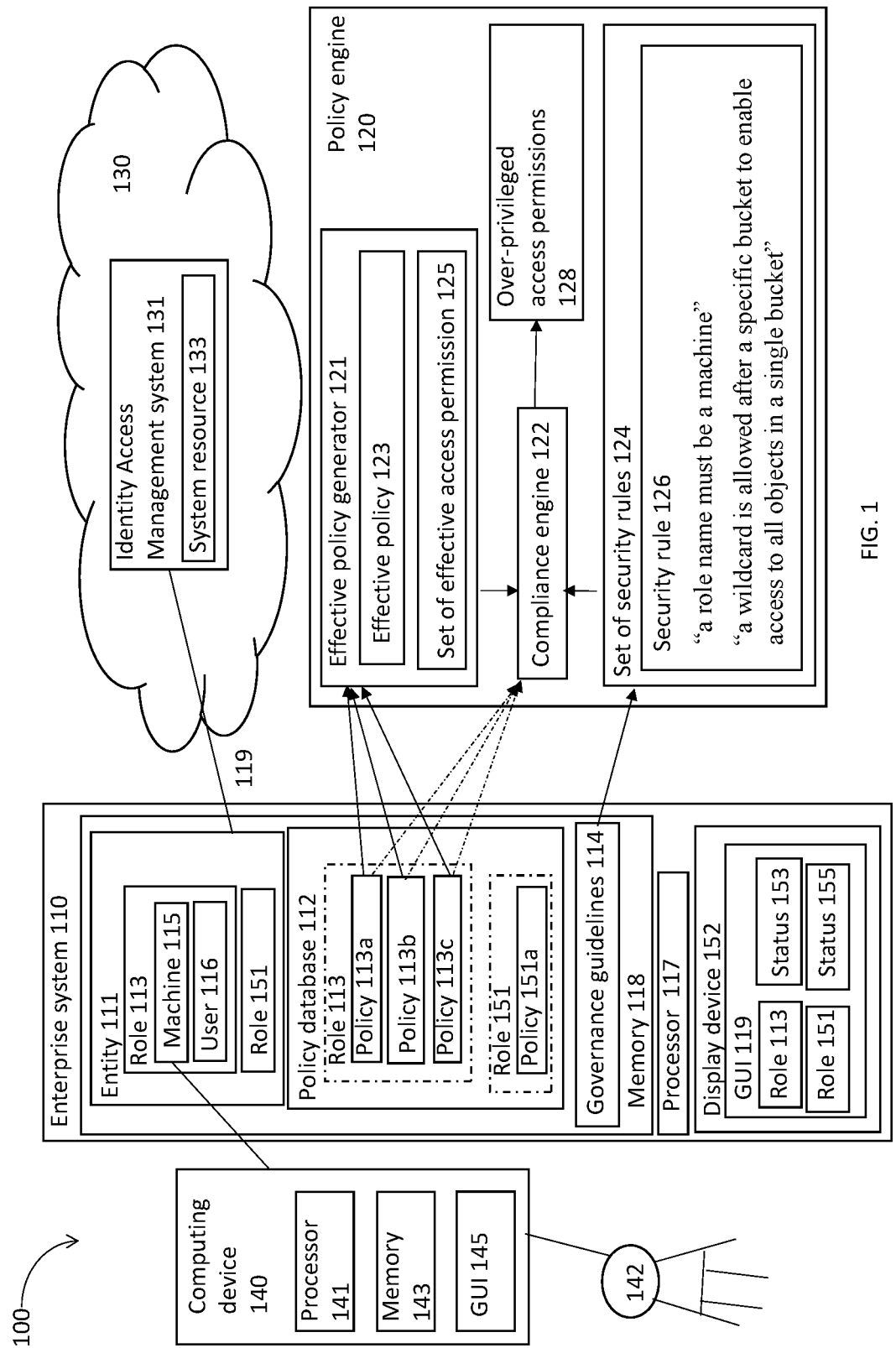
FIG. 1 is a block diagram of an environment for displaying a compliance status of a role of an identity and access management (IAM) system with respect to a set of security rules, according to some embodiments.

Identity and access management (IAM) is a framework of business processes, policies, and technologies that facilitates the management of electronic or digital identities of roles and system resources. IAM systems can provide access control to system resources by a role on a per-request basis. In general, an IAM system can grant or deny a request from a role to access system resources based on access permissions assigned to the role by one or more security policies. Such a request can be received from an enterprise system, and the request can identify the role. The following discussion presents interactions between an IAM system and an enterprise system but one skilled in the art would understand that the interactions apply to any requesting system that seeks access to a system resource based on access controls. The requesting system is therefore not limited to an enterprise system but any system that uses roles and permissions as part of access control to the system resource.

The request-response dynamic between the IAM system and an enterprise system presents challenges to the requesting system. First, the requesting system is not informed of any potential issues with respect to roles in its system until a request is made to the IAM system. Any corrective action to its roles is therefore reactive and presents a potential security concern because roles are not evaluated until a request is made. This provides an opportunity for compromised and/or over-privileged roles (e.g., roles controlled by a hacker) to be hijacked and used to improperly gain elevated access to system resources. Second, the requesting system relies on the IAM system in determining whether its roles are compliant with permission controls for accessing system resources.

The features described in this disclosure allow an enterprise system to monitor access permission compliance of roles with access control (AC) for accessing system resources of an IAM system without any requests being made. Access privileges or permissions to system resources by a role are granted according to security policies. There are many kinds of security policies that work together to provide effective access permissions for a role to access system resources. However, due to the complexity of many security policies, sometimes a role can have an unintended, improper, or over-privileged access permission to some system resources for which the role should not have access to. For security reasons, it is important to prevent a role from having an over-privileged access permission to system resources.

In some examples, an over-privileged access permission is detected by comparing permissible scopes of access permissions defined by a set of security rules with a set of effective access permissions defined by a set of security policies associated with the role. Based on the set of effective access permissions, an enterprise system can perform preemptive evaluation of access permissions associated with a role to identify any over-privileged access permission of the role to system resources. The preemptive evaluation of the access permissions can be performed with respect to a set of security rules, which can be defined by an enterprise or a corporation based on their security needs and some information security standards. Security rules based on information security standards, e.g., International Organization for Standardization (ISO)/International Electrotechnical Commission (IEC) 27000 series of standard, can be used to implement information security controls to meet an organization's requirements and prevent from granting a role some over-privileged access to system resources.

Hence, the enterprise system can detect over-privileged access permissions associated with a role in an IAM system without having to submit any requests to the IAM system. When a role has an over-privileged access permission, the compliance status of the role is non-compliant. On the other hand, if the role does not have any over-privileged access permission, the compliance status of the role is compliant. The enterprise system can further display on a graphical user interface (GUI) a set of roles and its corresponding compliance status. In some embodiments, the enterprise system can detect over-privileged access permissions because the operations are performed by the enterprise system independent of the IAM system. Accordingly, the mechanisms discussed in the current disclosure are implemented by a machine with a specific arrangement, where the policy engine is separated from the IAM system to provide more security protection for the IAM system. In some embodiments, the enterprise system detecting over-privileged access permissions is separated from the IAM system.

In some enterprise systems, there can be a large number of roles, e.g., hundreds of thousands to millions of roles. A GUI can help the enterprise system to manage the large number of roles and its compliance status. Without a GUI for the enterprise system, it will be time consuming (if even possible) to manage the large number of roles. In addition, the GUI for the set of roles can further generate a notification to the role or the entity administering the role to inform the compliance status of the role, generate a remediation security policy for correcting the security policies providing the over-privileged access permissions, and transmit an indication of the remediation policy to the role or the entity administering the role. A sequence of the above identified tasks for millions of roles would be impossible to be accomplished using the current computer system due to large complexity. Accordingly, embodiments herein improve the functionalities and security of enterprise systems.

FIG. 1 is a block diagram of an environment 100 for displaying a compliance status of a role of an IAM system with respect to a set of security rules, according to some embodiments. Environment 100 can include enterprise system 110, policy engine 120, and IAM system 131, which can reside in a cloud computing system 130. In addition, enterprise system 110 can be communicatively coupled to a computing device 140 that can be used by a person 142. Enterprise system 110 can include a GUI 119 to display on display device 152, with respect to a set of security rules 124, various roles and their corresponding compliance status, e.g., role 113 and its compliance status 153, and role 151 and its compliance status 155.

In some examples, environment 100 can include a network formed by some or all of computing device 140, enterprise system 110, and cloud computing system 130. For example, environment 100 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some examples, cloud computing system 130 can include an environment that delivers computing as a service or shared resources. Cloud computing system 130 can provide computation, software, data access, storage, and/or other services that do not require end-user knowledge of a physical location and configuration of a system and/or a device that delivers the services. In some examples, cloud computing system 130 can include Amazon® Web Services (AWS), Microsoft® Azure, Google® Cloud, IBM® Cloud, Oracle® Cloud Infrastructure, or any other cloud computing system.

Cloud computing system 130 can include IAM system 131, which can manage system resources 133. IAM system 131 can receive a request 119 for access to system resources 133 from entities in enterprise system 110 such as entity 111. Entity 111 can be resource objects to be used for authentication to access an account of IAM system 131, e.g., an account. IAM system 131 can include a plurality of data storage systems for storing system resources 133 to be accessed by enterprise system 110. IAM system 131 can include a database management system or relational database tool. IAM system 131 can further include a message queue or stream processing platform such as Apache Kafka or Apache Spark or other data storage systems like Apache Hadoop, Hadoop Distributed File System (HDFS), or Amazon S3, to name just some examples. IAM system 131 can be a data lake, data silo, semi-structured data system (comma-separated values file, logs, xml, etc.), unstructured data system, binary data repository, or other suitable repository. IAM system 131 can store thousands, millions, billions, or trillions (or more) of objects, rows, transactions, records, files, logs, etc. while allowing for the creation, modification, retrieval, archival, and management of this data.

System resources 133 can include hardware, e.g., processor, memory, storage, or software, e.g., operating system, application software, database, used for various computing purposes. A system resource can be referred to as a resource. Examples of system resources 133 can include Amazon Elastic Compute Cloud (Amazon EC2), Amazon Simple Storage Service (Amazon S3), Amazon DynamoDB, Amazon Redshift, an Amazon® Web Services (AWS) service, an EC2 instance, a S3 bucket, or a DynamoDB table, S3 Glacier vaults, Amazon Simple Notification Service (SNS) topics, or Amazon Simple Queue Service (SQS) queues. System resources 133 can be products or services provided by any other vendors besides Amazon®.

In some examples, computing device 140 can be a wireless communication device, a smart phone, a laptop, a tablet, a personal assistant, a monitor, a wearable device, an Internet of Thing (IoT) device, a mobile station, a subscriber station, a remote terminal, a wireless terminal, or a user device. Computing device 140 can be configured to operate based on a wide variety of wireless communication techniques. These techniques can include, but are not limited to, techniques based on 3rd Generation Partnership Project (3GPP) standards. In some other examples, computing device 140 can be a desktop workstation, a server, and/or embedded system, a computing device communicatively coupled to enterprise system 110 by wired lines, to name a few non-limiting examples, or any combination thereof. Person 142 can use computing device 140 to interact with enterprise system 110, and request system resources 133 managed by IAM system 131 and resided in cloud computing system 130. Computing device 140 can include processor 141, memory device 143, and a GUI 145. The functions and operations performed by person 142 can be performed by an application, or some other machines as well. Hence, functions and operations performed by person 142 can be equally applicable to other applications and machines.

In some examples, enterprise system 110 can include a server device (e.g., a host server, a web server, an application server, etc.), a data center device, or a similar device. Enterprise system 110 can include processor 117, memory device 118, display device 152 communicatively coupled to each other. GUI 119 can be displayed on display device 152. Enterprise system 110 further includes other components, e.g., an operating system, a storage coupled to processor, not shown. Enterprise system 110 may be implemented as any system that requests access to resources 133 protected by IAM system 131 that utilizes security policies and access permissions for controlling access to requested resources.

In some embodiments, enterprise system 110 can include any number of entities, e.g., entity 111, a policy database 112, and a security governance guideline 114, which can be stored in memory device 118. Entity 111 can include one or more roles, e.g., role 113, and role 151. In the following descriptions, role 113 can be used as an example of any roles of entity 111. Policy database 112 can include one or more security policies, which can be referred to as a policy, associated with roles. For example, policy 113a, policy 113b, and policy 113c are associated with role 113, and policy 151a is associated with role 151. Combined, the security policies, e.g., policy 113a, policy 113b, or policy 113c, can generate an effective policy 123 for role 113, which can define a set of effective access permissions 125 by role 113 to access system resources 133. On the other hand, security governance guideline 114 can define a set of security rules 124 including various security rules, e.g., security rule 126. Security rule 126 can set up a permissible scope of a name for role 113 or a permissible scope of a name for system resources 133 being specified by any security policies. Compliance engine 122 can be configured to receive the effective policy 123 indicating the set of effective access permissions 125 from effective policy generator 121, and security rule 126, and determine whether there is over-privileged access permission 128. If the set of effective access permissions 125 contains over-privileged access permission 128, role 113 has a compliance status 153 as non-compliant. On the other hand, if compliance engine 122 cannot detect any over-privileged access permission for the set of effective access permissions 125, role 113 has compliance status 153 as compliant. Role 113 and its compliance status 153 can be displayed on GUI 119 of enterprise system 110. Multiple roles and their corresponding compliance status can be displayed on GUI 119. For example, role 151 together with its compliance status 155 can be displayed on GUI 119 as well.

Enterprise system 110 is communicatively coupled to policy engine 120, where effective policy generator 121 and compliance engine 122 can be implemented to perform operations about security policies and access permissions. In some embodiments, policy database 112 can be implemented separately from enterprise system 110, such as in policy engine 120 and/or IAM system 131 coupled to enterprise system 110. In some other embodiments, policy engine 120 can be implemented as a part of enterprise system 110.

In some examples, entity 111 can be resource objects to be used for authentication to access an account of IAM system 131. Entity 111 can include one or more associated roles, e.g., role 113 or role 151. Role 113 can be stored in policy database 112. Role 113 can be used to delegate access to users, applications, or services that do not normally have access to system resources 133. For example, role 113 can be used to delegate access by a mobile app on computing device 140 to use system resources 133, which would not be normally accessible by a mobile application. Role 113 can be used to grant access to resources in one account to a trusted principal in a different account. Instead of being uniquely associated with one person, role 113 is intended to be assumable by anyone who needs it. Also, in some embodiments, role 113 may not have standard long term credentials such as a password or access keys associated with it. Instead, role 113 can be provided with temporary security credentials for a session when the role is effective or valid.

Role 113 can include a machine 115 or a user 116. Machine 115 can be a representation of computing device 140, while user 116 can be a representation of person 142. User 116 can be an identity of person 142 in the service. Role 113 can be an identity that has specific access permissions. Role 113 can access system resources 133 based on access permissions defined by associated security policies, e.g., policy 113a, policy 113b, and policy 113c.

Entity 111, e.g., role 113, can submit request 119 for accessing system resources such as system resources 133 which are protected by IAM system 131. Request 119 can include a request context information, which is used to evaluate and authorize the request. The request context information can include actions or operations to be performed, resources upon which the actions or operations are performed, a principal that can be a person or an application that an entity to send request 119, environment data such as IP address, user agent, SSL enabled status, or the time of day; and resource data such as data related to the resource that is being requested. Information about the principal can include the policies that are associated with the entity that the principal used to sign in. Resource data can include information such as a database table name or a tag on an Amazon EC2 instance. Request 119 can be allowed or denied based on the security policies, e.g., policy 113a, policy 113b, and policy 113c, associated with role 113.

A security policy, e.g., policy 113a, policy 113b, or policy 113c, can be stored in a storage of cloud computing system 130. Combined, the security policies, e.g., policy 113a, policy 113b, or policy 113c, can generate effective policy 123, which can define a set of effective access permissions 125 by role 113 to access system resources 133. The generation of effective policy 123 and the set of effective access permissions 125 can be performed by effective policy generator 121 within policy engine 120. The set of effective access permissions 125 represent the actual access permissions granted to role 113 by the security policies associated with role 113. In some examples, a system administrator can create the set of security policies that generates the set of effective access permissions 125 for role 113.

In addition, security governance guideline 114 can define a set of security rules 124 including various security rules, e.g., security rule 126. Security rule 126 can specify what kind of access permissions should be granted to various roles or system resources in an enterprise or an organization. As such, security rule 126 can set up the scope for what access permission is allowed to be granted to various roles, e.g., role 113. For example, security rule 126 can set up a permissible scope of a name for role 113 or a permissible scope of a name for system resources 133 being specified by any security policies. As an example, security rule 126 can include various statements, e.g., "a role name must be a machine", "a wildcard is allowed after a specific bucket to enable access to all objects in a single bucket," and more.

Often, the set of security policies actually defining the set of effective access permissions 125 for role 113 and the set of security rules 124 defining the permissible scopes for access permissions for role 113 are defined or generated at different times, by different people within the enterprise. Hence, it is possible that the set of effective access permissions 125 actually granted to role 113 can be different from what is allowed to be granted to role 113 as defined by security rule 126 or the set of security rules 124. An access permission of the set of effective access permissions 125 is an over-privileged access permission when the access permission exceeds the permissible scope defined by security rule 126. Detection of over-privileged access permission 128 is performed by compliance engine 122 based on security rule 126 of the set of security rules 124 that is defined based on security governance guideline 114.

If role 113 has been granted an over-privileged access permission, request 119 may be able to access system resources 133 that should not be allowed to access according to security rule 126. However, IAM system 131 or enterprise system 110 may not know such an over-privileged access permission has been granted until some bad consequence has happened after role 113 has accessed the system resource. Any corrective action to its roles is therefore reactive and presents a potential security concern because roles are not evaluated until a request is made and granted, and potentially some bad consequence may have already happened.

In some examples, policy engine 120 can be used to evaluate the set of effective access permissions 125 of role 113 without performing any request or any request context information. Policy engine 120 can be implemented as a separate component as shown in FIG. 1 or integrated as part of enterprise system 110. Policy engine 120 can include effective policy generator 121, the set of security rules 124, and compliance engine 122. Effective policy generator 121 can be configured to receive all policies associated with a role, such as policy 113a, policy 113b, and policy 113c associated with role 113, and generate effective policy 123 from the received policies. Effective policy 123 further defines the set of effective access permissions 125.

Figure 2:
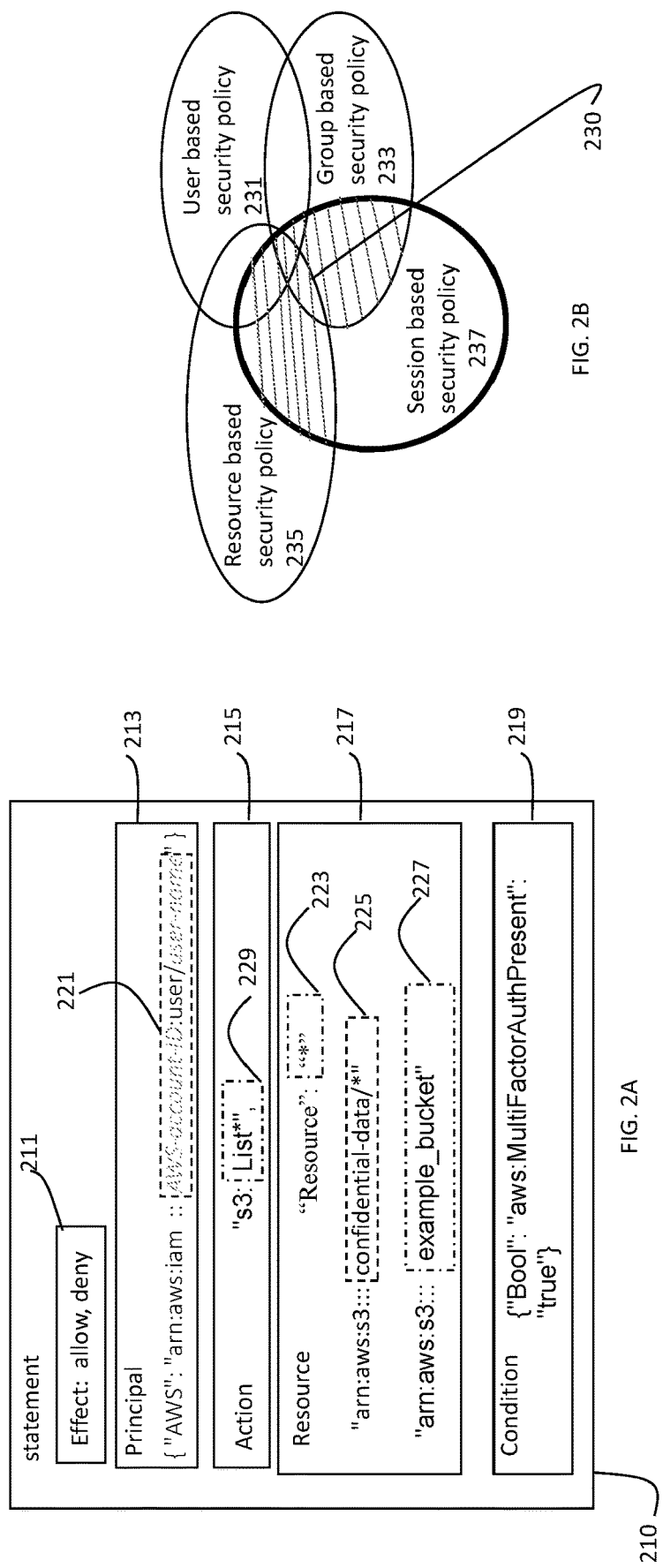
FIGS. 2A-2B are diagrams illustrating example security policies and a set of effective access permissions defined by security policies used in determining a compliance status of a role, according to some embodiments.

FIGS. 2A-2B are diagrams illustrating example security policies and a set of effective access permissions defined by a set of security policies used in determining a compliance status of a role, according to some embodiments. FIG. 2A shows an example security policy 210. Security policy 210 can be an example of policy 113a, policy 113b, policy 113c, or policy 151a as shown in FIG. 1. FIG. 2B shows an example set of effective access permissions 230 defined by multiple security policies, which can be an example of the set of effective access permissions 125 shown in FIG. 1.

In some examples, security policy 210 can be an identity-based policy, a resource-based policy, a permissions boundary, an organizational service control policy (SCP), an access control list, a session policy, an inline policy, or any kind of security policy. An identity-based policy can be attached to an identity such as a user, a group of users, or a role, and grant permissions to the identity. A resource-based policy can grant permissions to a principal (account, user, role, or federated user) specified in the policy to access the resource. The permissions define what the principal can do with the resource to which the policy is attached. A security policy can be stored in a storage of cloud computing system 130. In some examples, a security policy can be specified by natural language. In some other examples, a security policy can be specified by one or more statements in a markup language or structured language. A security policy can be contained in a document specified by a markup language, such as a JavaScript Object Notation (JSON) document, a XML document, a YAML document, or any other documents containing statements in structured languages. Natural language processing can be used to convert a security policy in natural language, e.g., English, to a structured language.

In some examples, security policy 210 can include an effect statement 211, a principal statement 213, an action statement 215, a resource statement 217, a condition statement 219, or some other statements. Effect statement 211 can specify either Allow or Deny to indicate whether the policy allows or denies access. Principal statement 213 can be used to indicate an account, a user, a role, or a group of users to which the access permission is allowed or denied. Action statement 215 can include a list of actions to be performed on the one or more system resources that the policy allows or denies. Action statement 215 can include a read-only action, a view action, an update action, a write action, a delete action, or some other actions. Resource statement 217 can specify a list of resources to which the actions apply. Condition statement 219 can specify the circumstances under which the policy grants permission. In addition, there can be other statements, such as a version statement, a statement name (also referred to as an identification (ID)), and more, not shown.

In some examples, a statement can include a name for a role, e.g., name 221 within principal statement 213; a name for a system resource, e.g., name 223, name 225, name 227, within resource statement 217; or a name for an action, e.g., name 229 within action statement 215, or some other names. A name for a system resource can include one or more system resources. For example, name 223 includes only "*", which is a wildcard referring to any system resources in the account. On the other hand, name 227 includes "example_bucket", which refers to only one bucket stored in S3. In addition, name 225 includes "confidential-data/*", which refers to a set of system resources within the folder "confidential-data." The set of system resources referred by a name for a system resource defines a scope of the name for the system resource. For example, a scope of name 227 includes only "example_bucket", while a scope of name 223 includes every system resource of the account, "*". A name for a system resource can be defined in a resource statement or other statement for a security policy. Similarly, a scope of a name for a role can include one or more roles. For example, name 221 "AWS-account-ID:user/user-name" can refer to only one user. On the other hand, a name "AWS-account-ID:user/*" can refer to a group of users. When a scope of the name for a system resource in a security policy statement includes more than one system resource, the security policy statement can be applicable to any system resource whose name is included in the scope of the name for the system resource. Similarly, when a scope of a name for a role in a security policy statement includes more than one role, the security policy statement can be applicable to any role whose name is included in the scope of the name for the role.

Accordingly, for a system resource, the name of the system resource can be included in multiple policy statements of multiple security policies, either explicitly or implicitly as shown above. In some examples, a first security policy can include a first policy statement applicable to the system resource, and a second security policy can include a second policy statement applicable to the same system resource by a role. Moreover the first policy statement may grant access to the system resource while the second policy statement may deny access to the system resource by the same role. Accordingly, a conflict between the first security policy and the second security policy occurs when the first policy statement and the second policy statement have conflicting effects on the system resource or the role. Depending on the kind of policy statements and the kind of security policies, different conflicts can be resolved in different ways. In some examples, a grant access to the system resource by the role specified by the first policy statement can overwrite a deny access to the system resource by the role specified by the second policy statement. In some other examples, a deny access to the system resource by the role specified by the first policy statement can overwrite a grant access to the system resource by the role specified by the second policy statement. In some examples, there can be implicit grant, explicit grant, implicit deny, and explicit deny, and various interactions between the different kinds of statements can be defined. The details of a conflict resolving mechanism can be determined by IAM system 131 or enterprise system 110.

As shown in FIG. 2B, multiple security policies, e.g., policy 231, policy 233, policy 235, and policy 237, can be associated with a role to generate a set of effective access permissions 230, which can be an example of the set of effective access permissions 125. Different security policies can generate the set of effective access permissions in different ways.

In some examples, as shown in FIG. 2B, both policy 231 and policy 233 are identity-based policies. Policy 231 is applicable to a single role, e.g., role 113, while policy 233 is applicable to a group of roles including role 113. Hence, the scope of policy 231 is a set of roles including only one role, while the scope of policy 233 is a set of roles including a group of roles. In the description below, the scope of policy 231 can be simply denoted by the policy number "231", and the scope of policy 233 can be simply denoted by the policy number "233". For an action to be performed, an effective access permission can be in a union of the set of access permissions defined by policy 231 or policy 233. Hence, the set of effective access permissions 125 defined by policy 231 and policy 233 is 231∪233. Accordingly, given policy 231 and policy 233, for request 119, IAM system 131 can check both policy 231 and policy 233 for at least one Allow action for granting an access to the system resource for role 113. As long as one Allow action is found for role 113, role 113 can still be allowed access based on the union of the scopes of the policy statements. Hence, the conflict between an Allow action and an implicit Deny action for role 113 can be resolved by having the Allow action overwrites the implicit Deny action for role 113. On the other hand, an explicit Deny action can overwrite an Allow action.

In addition, policy 235 is a resource-based policy. For an action to be performed, an effective access permission can be in a union of the set of access permission defined by policy 231, policy 233, and policy 235, e.g., 231∪233∪235. Hence, for request 119, IAM system 131 can check policy 231, policy 233, and policy 235 for at least one Allow action for granting an access to the system resource.

Further, policy 237 can be a session policy. In this case, the permissions from resource-based policy 235 are added to the role or user's identity-based policy 231 and policy 233 before the session is created. Session policy 237 limits the total permissions granted by the resource-based policy and the identity-based policy. The resulting session's permissions are the intersection of the session policies and either the resource-based policy or the identity-based policy, denoted as (231∪233∪235) n 237. Hence, the conflict between an Allow action indicated by the resource-based policy or the identity-based policy and a Deny action indicated by the session policy for role 113 can be resolved by having the Deny action overwrites the Allow action for role 113.

The examples of effective access permissions shown in FIG. 2B are only for example purposes and are not limiting. There can be other kinds of security policies. An organization's service control policies (SCPs) can specify the maximum permissions for an organization or organizational unit (OU), which is applicable to individual roles, e.g., role 113. The SCP maximum applies to principals in member accounts, including each AWS account root user of the organization. If an SCP is present, identity-based and resource-based policies grant permissions to principals in member accounts only if those policies and the SCP allow the action. If both a permissions boundary and an SCP are present, then the boundary, the SCP, and the identity-based policy must all allow the action. In addition, access control lists (ACLs) are service policies that control which principals in another account can access a resource.

Accordingly, FIG. 2B illustrates an example for the set of effective access permissions 230, which can be examples of the set of effective access permissions 125 defined by a set of security policies. The set of effective access permissions 125 can be generated by effective policy generator 121 within policy engine 120. Effective policy generator 121 can receive all of the security policies applicable or associated with role 113, which is called the effective policy 123. Based on the effective policy 123, the set of effective access permissions 125 can be generated similar to examples shown in FIG. 2B. In some examples, effective policy 123 can include a first security policy and a second security policy. The set of effective access permissions 125 can be generated based on effective policy 123 by resolving at least a conflict between the first security policy and the second security policy. For example, the conflict can be resolved for various security policies as described above. Furthermore, the set of effective access permissions 125 is provided as inputs to compliance engine 122 to detect whether there is an over-privileged access permission 128 with respect to security rule 126.

Referring back to FIG. 1, compliance engine 122 can be configured to receive effective policy 123 indicating the set of effective access permissions 125 from effective policy generator 121, and security rule 126, and determine whether there is over-privileged access permission 128. In some other examples, compliance engine 122 can detect whether there is over-privileged access permission 128 by directly receiving the security policies, e.g., policy 113*a*, policy 113*b*, and policy 113*c*. If the set of effective access permissions 125 contains over-privileged access permission 128, compliance engine 122 can identify the related security policies that generate such over-privileged access permission 128, and label the identified security policies having a compliance status as non-compliant. Accordingly, role 113 has a compliance status as non-compliant. On the other hand, if the set of effective access permissions 125 does not contain any over-privileged access permission, compliance engine 122 can label the effective policy 123 having a compliance status as compliant. Accordingly, role 113 has a compliance status as compliant.

Compliance engine 122 can be configured to receive the set of security rules 124 including security rule 126. Security rule 126 can be generated based on security governance guideline 114. In some examples, security rule 126 can be created based on an information security standard, an International Organization for Standardization (ISO)/International Electrotechnical Commission (IEC) 27000 series of standard, a National Institute of Standards and Technology (NIST) Special Publications 800 standard, an Information Security Forum (ISF) Standard of Good Practice (SoGP) standard, or a Control Objectives for Information and related Technology (COBIT) standard. In some examples, security rule 126 can be referred to as permission controls.

In some examples, security rule 126 can be specified in plain English. For example, security rule 126 can include any or all of the following statements: "a resource name can include 5 characters, and followed by a wild card*"; "a role name must be a machine"; "a wildcard is allowed after a specific bucket to enable access to all objects in a single bucket"; or "a role name must be limited to a single entity account." In some examples, the English statement can be translated into a more structured statement. For example, "5 characters, and followed by a wild card*" can be translated into the format of "?????"+"*". Security rule 126 can include multiple statements, where each statement can impose a condition on a name for a system resource, a name for a role, a name for an action, or some other conditions. All the statements together in security rule 126 can define a permissible scope of a name for system resources, which can be an intersection set of the allowable names for system resources defined by all statements in security rule 126. Similarly, all the statements together in security rule 126 can define a permissible scope of a name for a role, a permissible scope of a name for an action, and other permissible scopes.

In some examples, compliance engine 122 can compare a scope of a name for a system resource indicated by the set of effective access permissions 125, which is defined by effective policy 123, with a permissible scope of the name for the system resource defined by a security rule to obtain a first comparison result. For example, compliance engine 122 can compare a scope of name 223, name 225, and name 227 for system resources within resource statement 217 of security policy 210, with a permissible scope of the name for system resources defined by security rule 126. The statement of security rule 126, "a wildcard is allowed after a specific bucket to enable access to all objects in a single bucket," defines a permissible scope for a name for system resources. Accordingly, the scope of name 227 includes only one system resource, "example_bucket". Hence, the scope of name 227 is within the permissible scope of a name for system resources defined by security rule 126. On the other hand, the scope of name 223 includes any system resources in the account, which is referred by "*". Hence, the scope of name 223 exceeds the permissible scope of a name for system resources defined by security rule 126. Furthermore, the scope of name 225 includes system resources within a folder "confidential-data/*", which can be within a single bucket. Hence, the scope of name 225 is within the permissible scope of a name for system resources defined by security rule 126 if the folder "confidential-data/" is within a single bucket. The first comparison result indicates whether the scope of the name for a system resource indicated by the set of effective access permissions 125 exceeds the permissible scope of the name for the system resource defined by the security rule.

In some examples, compliance engine 122 can compare a scope of a name for a role indicated by the set of effective access permissions 125 with a permissible scope of the name for the role defined by the security rule to obtain a second comparison result. For example, compliance engine 122 can compare a scope of name 221 for a role within principal statement 213 of security policy 210, with a permissible scope of the name for the role defined by security rule 126. The scope of name 221 includes only one user account, "AWS-account-ID:user/user-name". If security rule 126 includes the statement, "a role name must be a machine", the permissible scope of a role must be a machine. Hence, the scope of name 221 for a role exceeds the permissible scope of a role as defined by security rule 126. On the other hand, if security rule 126 includes a different statement, "a role name must be limited to a single entity account", the permissible scope of a name for a role can include multiple roles within a single entity account. Hence, the scope of name 221, including "AWS-account-ID:user/user-name", is within the permissible scope of the name for the role as defined by security rule 126. Similarly, the scope of a role name, "AWS-account-ID:user/*", is within the permissible scope of the name for a role as defined by security rule 126. The second comparison result indicates whether the scope of the name for a role defined in the second security policy exceeds the permissible scope of the name for the role defined by the security rule.

In some other examples, compliance engine 122 can compare a scope of a name for other components of security policy statements, e.g., an action name as indicated by the set of effective access permissions 125 with a permissible scope of the name for the component defined by the security rule to obtain further comparison result. Similar principles applied to the scope of a name for a system resource or the scope of a name for a role can be applied to the scope of the name for other components of security policies. Since compliance engine 122 is located outside IAM system 131 and separated from IAM system 131, compliance engine 122 is implemented by a particular machine, instead of a generic computing system. For example, compliance engine 122 can be separated from IAM system 131. Based on such an implementation on a special machine, compliance engine 122 can provide added security protection for IAM system 131.

Figure 3:
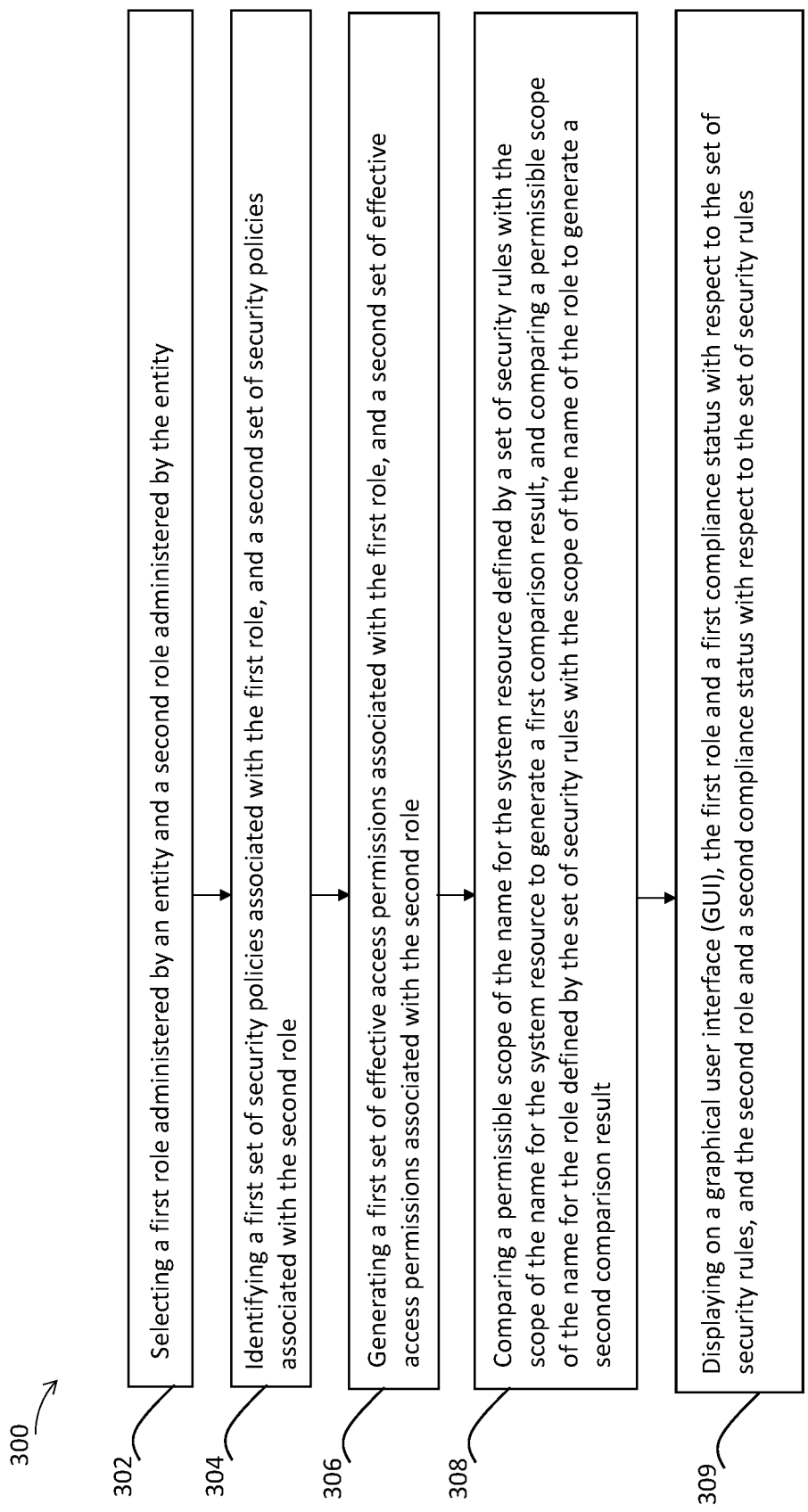
FIG. 3 is a flowchart illustrating a method for displaying a compliance status of a role with respect to a set of security rules, according to some embodiments.

FIG. 3 is a flowchart illustrating a method 300 for displaying a compliance status of a role with respect to a set of security rules, according to some embodiments. Method 300 can be performed by processor 117 of enterprise system 110 to display on GUI 119 role 113 and its compliance status 153, and/or role 151 and its compliance status 155.

Figure 4A:
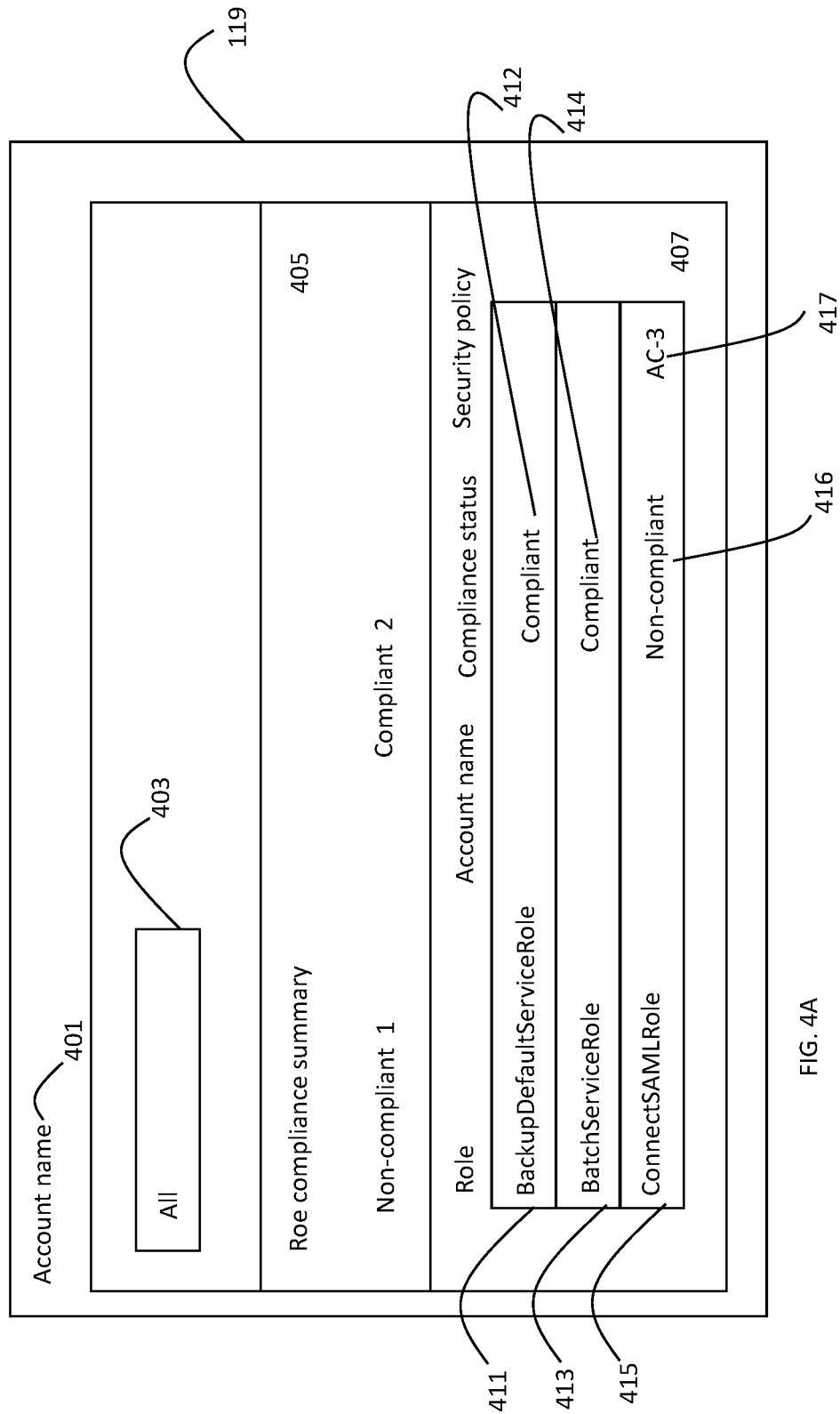
FIGS. 4A-4C are diagrams illustrating example displays of a compliance status of a role with respect to a set of security rules, according to some embodiments.

In 302, processor 117 can be configured to select a first role administered by an entity and a second role administered by the entity. For example, as shown in FIG. 1, processor 117 can be configured to select role 113 and role 151 administered by entity 111, which can own an account used for authentication to access IAM system 131. As shown in FIG. 4A, entity 111 can have an account name 401 displayed on GUI 119 of enterprise system 110. Furthermore, account name 401 can have multiple roles, e.g., role 411, BackupDefaultServiceRole; role 413, BatchServiceRole; and role 415, ConnectSAMLRole. Role 411, role 413, and role 415 can be selected by selecting a parameter 403, e.g., "all," to select all roles administered by account name 401. In some other examples, there can be other ways to select one or more roles by different parameters, e.g., by selection of one or more roles of a role list displayed on GUI 119. The first role and the second role are described as examples. In some examples, there can be one or more roles selected.

In 304, processor 117 can be configured to identify a first set of security policies associated with the first role, and identify a second set of security policies associated with the second role. For example, as shown in FIG. 1, processor 117 can be configured to identify a first set of security policies, security policy 113a, security policy 113b, and security policy 113c, associated with role 113. Processor 117 can be further configured to select a second set of security policies, security policy 151a, associated with role 151. Security policy 113a, security policy 113b, and security policy 113c can be an example of effective policy 123, which includes all of the security policies applicable to role 113. In some examples, some filters can be applied to select a subset of all of the security policies applicable to role 113.

In 306, processor 117 can be configured to generate a first set of effective access permissions associated with the first role, and a second set of effective access permissions associated with the second role. For example, as shown in FIG. 1, processor 117 can be configured to generate the set of effective access permissions 125 for effective policy 123, which can be applicable to role 113. The set of effective access permissions 125 can be generated based on effective policy 123 by resolving at least a conflict between the first security policy and the second security policy of effective policy 123, as described for FIG. 2B. The set of effective access permissions 125 can define a scope of a name for a system resource, or define a scope of a name for a role.

In 308, processor 117 can be configured to compare a permissible scope of the name for the system resource defined by a set of security rules with the scope of the name for the system resource to generate a first comparison result, and compare a permissible scope of the name for the role defined by the set of security rules with the scope of the name of the role to generate a second comparison result. Operations performed in 308 can be performed by compliance engine 122 operated by processor 117, or by sending a request to compliance engine 122 to perform the related operations as described above for compliance engine 122. For example, processor 117 can operate compliance engine 122 to, or cause compliance engine 122 to, compare a scope of name 221 for a role within principal statement 213 of security policy 210, with a permissible scope of the name for the role defined by security rule 126 or the set of security rules 124 to generate a first comparison result. Similarly, processor 117 can operate compliance engine 122 to, or cause compliance engine 122 to, compare a scope of name 223 for a system resource within resource statement 217 of security policy 210, with a permissible scope of the name for the role defined by security rule 126 to generate a second comparison result.

In 309, processor 117 can be configured to display on a GUI, the first role and a first compliance status with respect to the set of security rules, and the second role and a second compliance status with respect to the set of security rules. The first compliance status of the first role with respect to the set of security rules is determined based on the first comparison result and the second comparison result. For example, as shown in FIG. 1, processor 117 can be configured to determine, based on the set of security rules 124, compliance status 155 of role 151 associated with the set of security policies, e.g., policy 151a. Similarly, processor 117 can be configured to determine, based on the set of security rules 124, compliance status 153 of role 113 associated with the set of security policies, e.g., policy 113a, 113b, and 113c, based on the two comparison results performed at 308. As shown in FIG. 4A, GUI 119 can display role 411 with a compliance status 412 having a value as compliant, role 413 with a compliance status 414 having a value as compliant, and role 415 with a compliance status 416 having a value as non-compliant. Compliance engine 122 can determine role 415 has over-privileged access permission 128 when the scope of the name 223 for a system resource exceeds the permissible scope of the name for the system resource defined in security rule 126, or when the scope of the name 221 for a role exceeds the permissible scope of name for the role defined in security rule 126. On the other hand, compliance engine 122 can determine role 411 or role 413 does not have an over-privileged access permission. Accordingly, in such cases, role 411 or role 413 has a compliance status as compliant. As shown in window 407, role 411, role 413, and role 415 together with their corresponding compliance status can be shown in a tabular form on GUI 119.

In addition, as shown in FIG. 4A, processor 117 can be further configured to display more information on GUI 119. For example, GUI 119 can display a summary window 405 to show how many roles having compliant status, e.g., 2 roles having compliant status, and how many roles having a non-compliant status, e.g., 1 role having non-compliant status. Further, GUI 119 can display the security policy that is non-compliant with respect to the set of security rules, e.g., security policy 417, "AC-3".

Figure 4B:
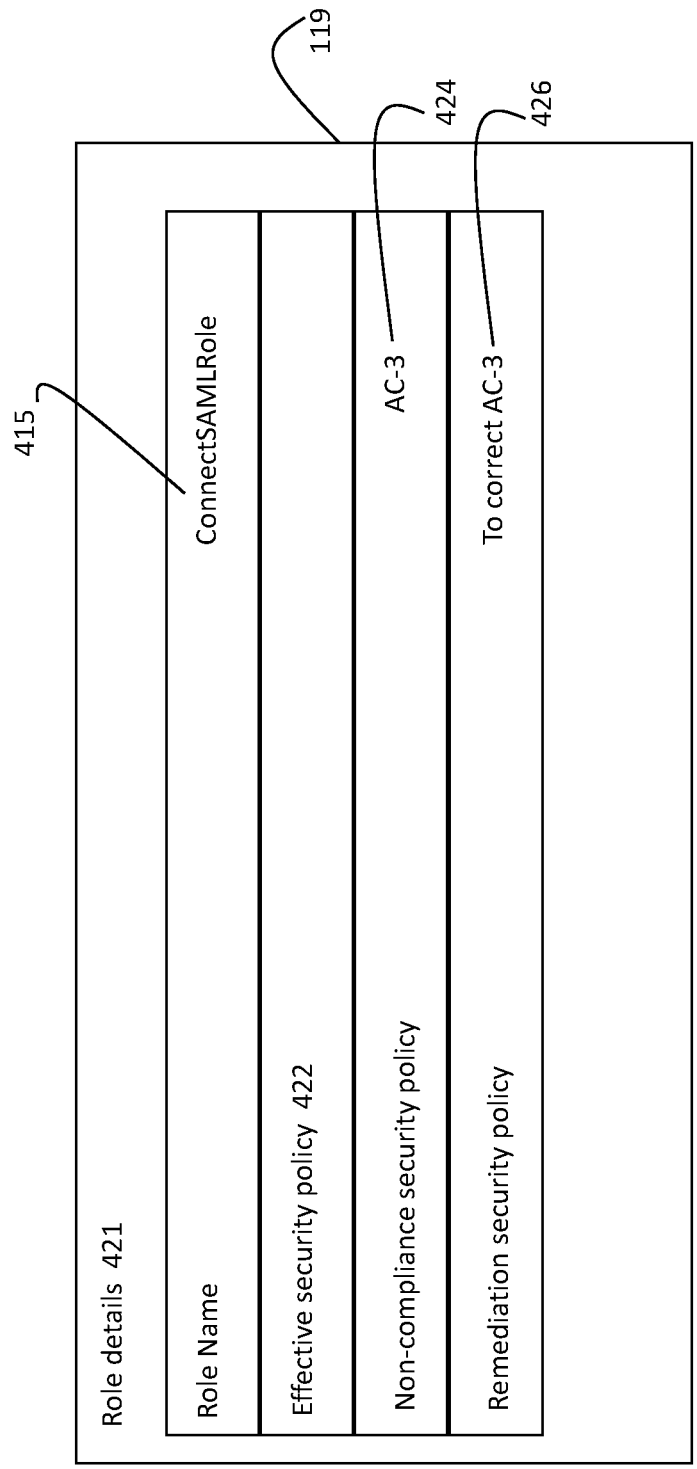

As shown in FIG. 4B, processor 117 can be further configured to display more information about an individual role on GUI 119 in a role details window 421. For example, role details window 421 can include a role 415 with a role name "ConnectSAMLRole." Role 415 is used as an example. Other roles, e.g., role 411, role 413, or other roles can be displayed with more detailed information as well. Role details window 421 can further include an indication of effective security policy 422, which can list some or all of the effective security policy 422; and an indication of non-compliance security policy 424, e.g., AC-3. Processor 117 can be further configured to generate a remediation security policy 426 for correcting the non-compliance security policy 424.

Figure 4C:
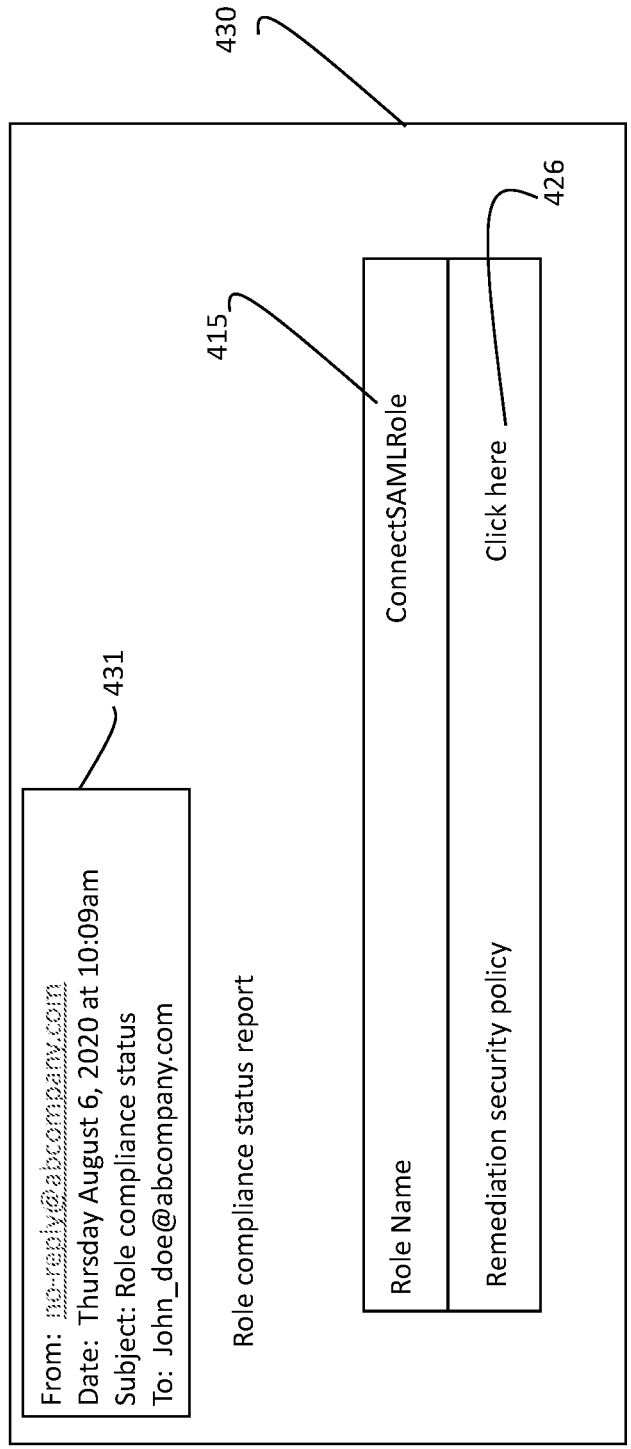

As shown in FIG. 4C, processor 117 can be further configured to generate a notification 430, which can be an email, to be sent to the role when the compliance status of the first role is non-compliant. Notification 430 can be an email that includes an email header 431, role 415 with a role name "ConnectSAMLRole," and an indication of remediation security policy 426 for correcting the non-compliance security policy 424. Furthermore, processor 117 can be configured to transmit to role 113 or entity 111, notification 430 with the indication of remediation policy 426.

Figure 5:
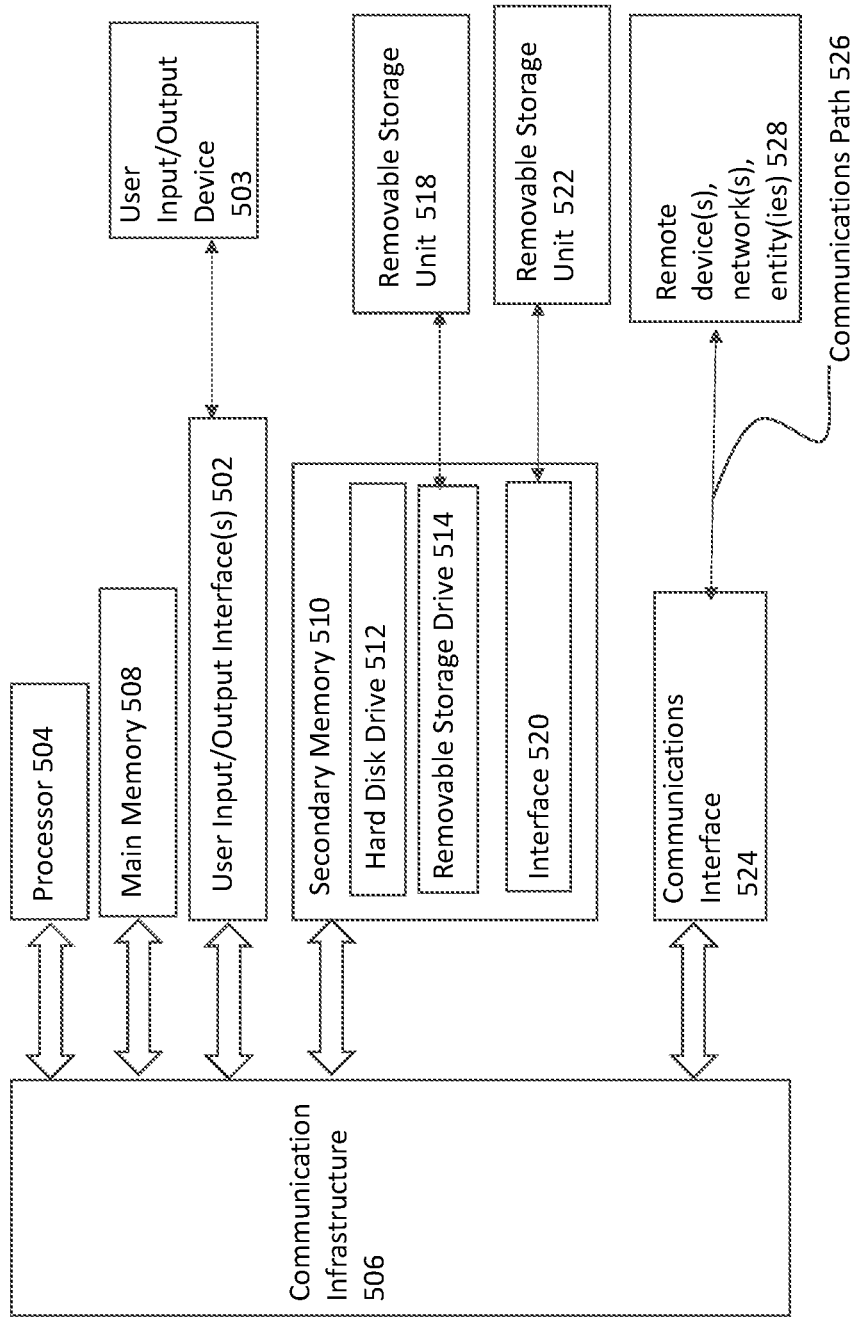
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to select a first role administered by an entity and a second role administered by the entity; identify a first set of security policies associated with the first role, and a second set of security policies associated with the second role, wherein the first set of security policies includes a first security policy and a second security policy; generate a first set of effective access permissions associated with the first role, and a second set of effective access permissions associated with the second role, wherein the first set of effective access permissions is generated based on the first set of security policies by resolving at least a conflict between the first security policy and the second security policy, and wherein the first set of effective access permissions defines a scope of a name for a system resource, or defines a scope of a name for a role; compare a permissible scope of the name for the system resource defined by a set of security rules with the scope of the name for the system resource to generate a first comparison result, and compare a permissible scope of the name for the role defined by the set of security rules with the scope of the name of the role to generate a second comparison result; and display on a graphical user interface (GUI), the first role and a first compliance status with respect to the set of security rules, and the second role and a second compliance status with respect to the set of security rules, wherein the first compliance status of the first role with respect to the set of security rules is determined based on the first comparison result and the second comparison result.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for determining compliance to security rules, the method comprising:
    selecting a first role administered by an entity and a second role administered by the entity;
    identifying a first set of security policies associated with the first role, and a second set of security policies associated with the second role, wherein the first set of security policies includes a first security policy and a second security policy;
    generating a first set of effective access permissions associated with the first role, and a second set of effective access permissions associated with the second role, wherein the first set of effective access permissions is generated based on the first set of security policies by resolving at least a conflict between the first security policy and the second security policy, and wherein the first set of effective access permissions defines a scope of a name for a system resource, or defines a scope of a name for a role;
    comparing a permissible scope of the name for the system resource defined by a set of security rules with the scope of the name for the system resource to generate a first comparison result, and comparing a permissible scope of the name for the role defined by the set of security rules with the scope of the name of the role to generate a second comparison result; and
    displaying on a graphical user interface (GUI), the first role and a first compliance status with respect to the set of security rules, and the second role and a second compliance status with respect to the set of security rules, wherein the first compliance status of the first role with respect to the set of security rules is determined based on the first comparison result and the second comparison result.

2. The computer-implemented method of claim 1, wherein the first compliance status is non-compliant when the scope of the name for the system resource defined by the first set of effective access permissions exceeds the permissible scope of the name for the system resource defined by the set of security rules, or when the scope of the name for the role defined by the first set of effective access permissions exceeds the permissible scope of the name for the role defined by the set of security rules.

3. The computer-implemented method of claim 2, further comprising:
    generating a notification to the first role when the first compliance status of the first role is non-compliant.

4. The computer-implemented method of claim 3, further comprising:
    generating a remediation security policy for correcting the first set of security policies that generates the first set of effective access permissions; and
    transmitting, to the first role, an indication of the remediation policy.

5. The computer-implemented method of claim 1, wherein the first compliance status is compliant when the scope of the name for the system resource defined by the first set of effective access permissions does not exceed the permissible scope of the name for the system resource defined by the set of security rules, and the scope of the name for the role defined by the first set of effective access permissions does not exceed the permissible scope of the name for the role defined by the set of security rules.

6. The computer-implemented method of claim 1, wherein the first role and the first compliance status, and the second role and the second compliance status are displayed in a tabular form on the GUI.

7. The computer-implemented method of claim 1, wherein the first set of security policies are stored in a cloud storage, the first set of security policies are specified by a markup language, and the first set of security policies include an identity-based policy, a resource-based policy, a permissions boundary, an organizational service control policy (SCP), an access control list, or a session policy.

8. The computer-implemented method of claim 1, wherein the first set of security policies includes an action to be performed on the system resource and an effect to indicate Allow or Deny of the action to be performed on the system resource.

9. The computer-implemented method of claim 8, wherein the action includes a read-only action, a view action, an update action, a write action, or a delete action.

10. An apparatus for managing system resources, the apparatus comprising:
    a display device configured to display a graphical user interface (GUI);
    a storage device coupled to the display device, and configured to store a set of security rules; and
    a processor communicatively coupled to the storage device and the display device, and configured to:
        select a first role administered by an entity and a second role administered by the entity;
        identify a first set of security policies associated with the first role, and a second set of security policies associated with the second role, wherein the first set of security policies includes a first security policy and a second security policy;
        generate a first set of effective access permissions associated with the first role, and a second set of effective access permissions associated with the second role, wherein the first set of effective access permissions is generated based on the first set of security policies by resolving at least a conflict between the first security policy and the second security policy, and wherein the first set of effective access permissions defines a scope of a name for a system resource, or defines a scope of a name for a role;
        compare a permissible scope of the name for the system resource defined by a set of security rules with the scope of the name for the system resource to generate a first comparison result, and compare a permissible scope of the name for the role defined by the set of security rules with the scope of the name of the role to generate a second comparison result; and display on the GUI, the first role and a first compliance status with respect to the set of security rules, and the second role and a second compliance status with respect to the set of security rules, wherein the first compliance status of the first role with respect to the set of security rules is determined based on the first comparison result and the second comparison result.

11. The apparatus of claim 10, wherein the first compliance status is non-compliant when the scope of the name for the system resource defined by the first set of effective access permissions exceeds the permissible scope of the name for the system resource defined by the set of security rules, or when the scope of the name for the role defined by the first set of effective access permissions exceeds the permissible scope of the name for the role defined by the set of security rules.

12. The apparatus of claim 11, wherein the processor is further configured to:
generate a notification to the first role when the first compliance status of the first role is non-compliant.

13. The apparatus of claim 12, wherein the processor is further configured to:
generate a remediation security policy for correcting the first set of security policies that generates the first set of effective access permissions including the name for the system resource or the name for the role; and
transmit, to the first role, an indication of the remediation policy.

14. The apparatus of claim 10, wherein the first compliance status is compliant when the scope of the name for the system resource defined by the first set of effective access permissions does not exceed the permissible scope of the name for the system resource defined by the set of security rules, and the scope of the name for the role defined by the first set of effective access permissions does not exceed the permissible scope of the name for the role defined by the set of security rules.

15. The apparatus of claim 10, wherein the first role and the first compliance status, and the second role and the second compliance status are displayed in a tabular form on the GUI.

16. The apparatus of claim 10, wherein the first set of security policies are stored in a cloud storage, the first set of security policies are specified by a markup language, and the first set of security policies include an identity-based policy, a resource-based policy, a permissions boundary, an organizational service control policy (SCP), an access control list, or a session policy.

17. The apparatus of claim 10, wherein the first set of security policies includes an action to be performed on the system resource, and an effect to indicate Allow or Deny of the action to be performed on the system resource.

18. A non-transitory computer-readable medium storing instructions, the instructions, when executed by a processor, cause the processor to perform operations comprising:
selecting a first role administered by an entity and a second role administered by the entity;
identifying a first set of security policies associated with the first role, and a second set of security policies associated with the second role, wherein the first set of security policies includes a first security policy and a second security policy;
generating a first set of effective access permissions associated with the first role, and a second set of effective access permissions associated with the second role, wherein the first set of effective access permissions is generated based on the first set of security policies by resolving at least a conflict between the first security policy and the second security policy, and wherein the first set of effective access permissions defines a scope of a name for a system resource, or defines a scope of a name for a role;
comparing a permissible scope of the name for the system resource defined by a set of security rules with the scope of the name for the system resource to generate a first comparison result, and comparing a permissible scope of the name for the role defined by the set of security rules with the scope of the name of the role to generate a second comparison result; and
displaying on a graphical user interface (GUI), the first role and a first compliance status with respect to the set of security rules, and the second role and a second compliance status with respect to the set of security rules, wherein the first compliance status of the first role with respect to the set of security rules is determined based on the first comparison result and the second comparison result.

19. The non-transitory computer-readable medium of claim 18, wherein the first compliance status is non-compliant when the scope of the name for the system resource defined by the first set of effective access permissions exceeds the permissible scope of the name for the system resource defined by the set of security rules, or when the scope of the name for the role defined by the first set of effective access permissions exceeds the permissible scope of the name for the role defined by the set of security rules.

20. The non-transitory computer-readable medium of claim 18, wherein the first compliance status is compliant when the scope of the name for the system resource defined by the first set of effective access permissions does not exceed the permissible scope of the name for the system resource defined by the set of security rules, and the scope of the name for the role defined by the first set of effective access permissions does not exceed the permissible scope of the name for the role defined by the set of security rules.

* * * * *